United States Patent [19]

Ould

[11] Patent Number: 4,715,169
[45] Date of Patent: Dec. 29, 1987

[54] EDGING ASSEMBLY

[76] Inventor: Maxwell K. Ould, 27 Severn Street, Epping, Victoria, Australia, 3076

[21] Appl. No.: 871,406
[22] PCT Filed: Aug. 30, 1985
[86] PCT No.: PCT/AU85/00208
§ 371 Date: May 5, 1986
§ 102(e) Date: May 5, 1986
[87] PCT Pub. No.: WO86/01371
PCT Pub. Date: Mar. 13, 1986

[30] Foreign Application Priority Data

Sep. 6, 1984 [AU] Australia ............... PG6973

[51] Int. Cl.$^4$ ............................................. A01D 35/26
[52] U.S. Cl. ........................................ 56/16.9; 56/256
[58] Field of Search ............... 56/16.9, 11.6, 11.8, 56/13.7, 10.8, 11.5, 12.7, 121.46, 256

[56] References Cited

U.S. PATENT DOCUMENTS

| 3,803,818 | 4/1974 | Chaney | 56/16.9 |
| 3,871,160 | 3/1975 | Hopper | 56/16.9 |
| 4,170,099 | 10/1979 | Owens | 56/16.9 |
| 4,242,855 | 1/1981 | Beaver, Jr. | 56/16.9 |
| 4,478,028 | 10/1984 | Dawson, Jr. | 56/16.9 |
| 4,528,805 | 7/1985 | Zitta | 56/16.9 |

Primary Examiner—Stephen J. Novosad
Assistant Examiner—William P. Neuder
Attorney, Agent, or Firm—Townsend and Townsend

[57] ABSTRACT

An edging attachment for motor mower comprising a plate that is bolted to the mower housing, the plate supporting a drive shaft carrying an idler pulley and a drive pulley, a drive belt interconnecting a pulley on the motor of a mower to either the idler pulley, means to selectively engage either the idler or drive pulley and an edging means operating in a plane substantially perpendicular to the cutting plane of the mower. The edging means is supported by the plate via a boom and is driven by the drive shaft via a flexible spindle drive. The boom allows adjustment of the cutting angle of edging means. The position of the drive shaft and pulleys is also adjustable relative to the motor of the mower.

17 Claims, 4 Drawing Figures

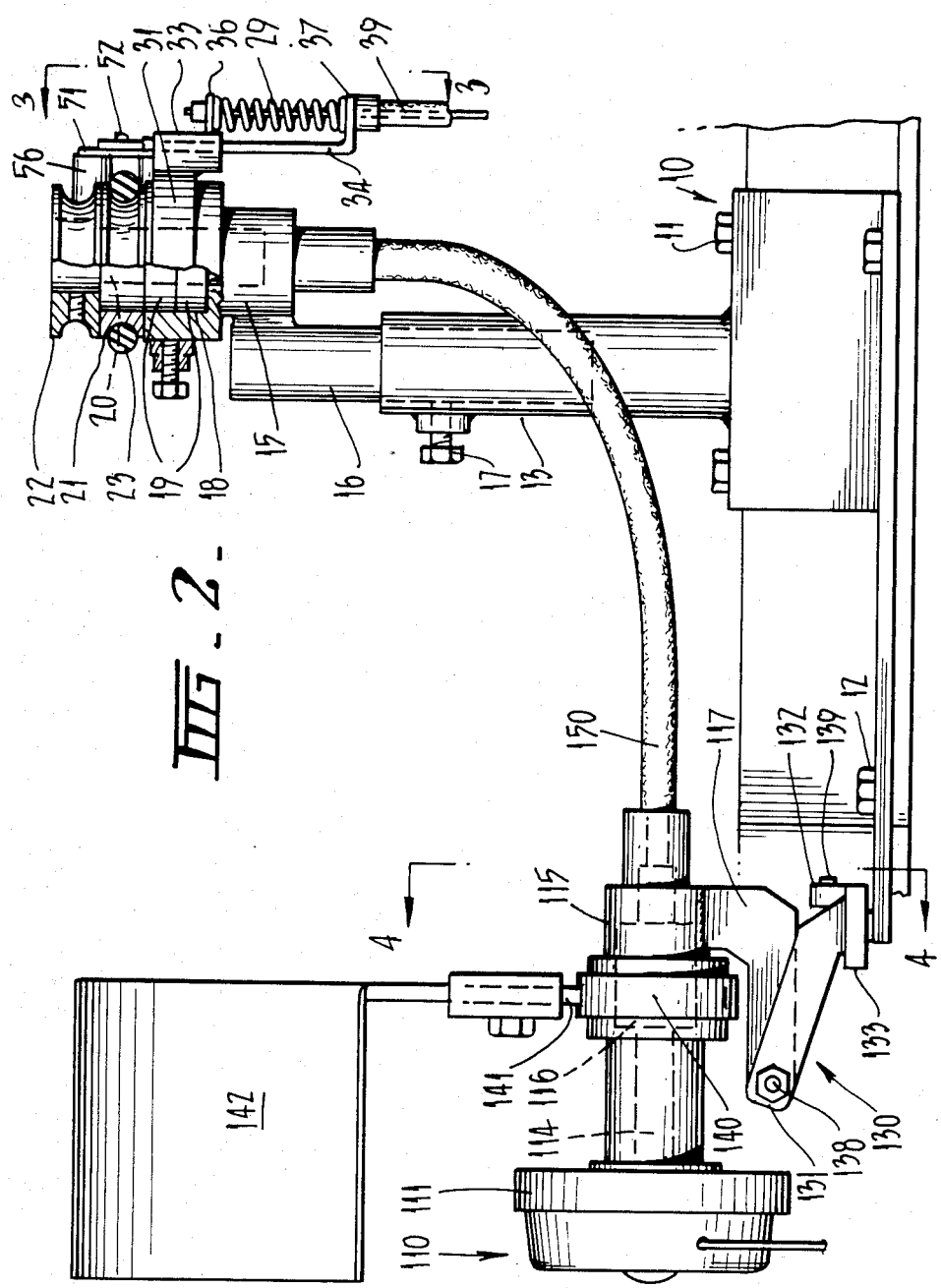

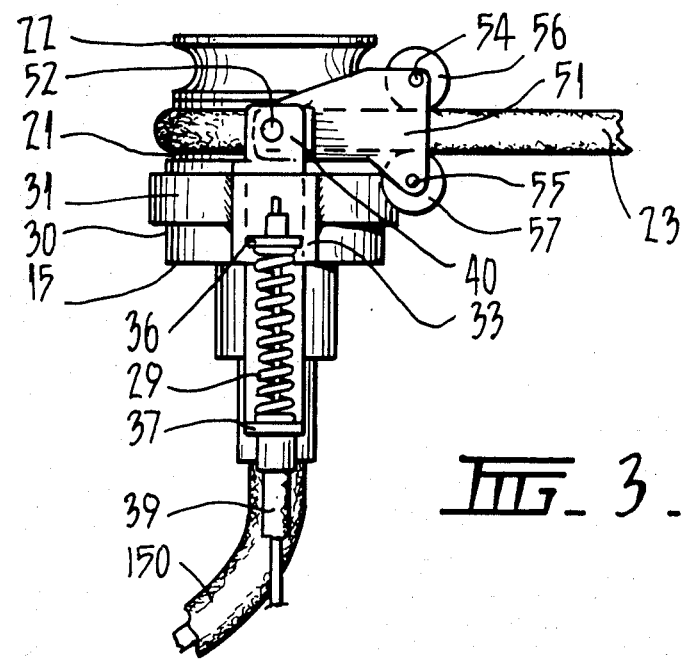
FIG_3.
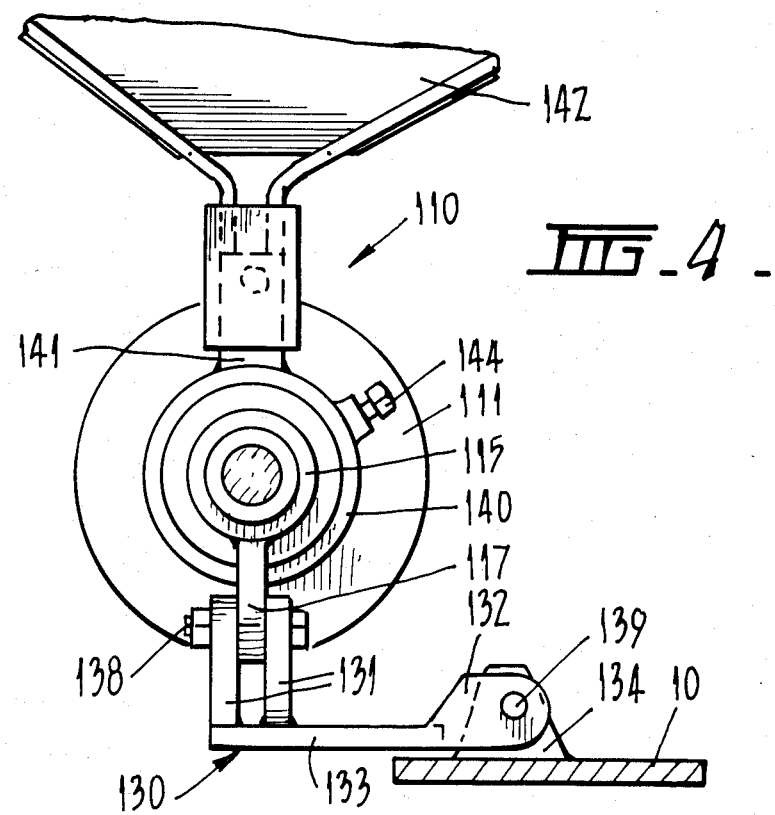
FIG_4.

EDGING ASSEMBLY

BACKGROUND OF THE INVENTION

This invention relates to an edging assembly for attachment to a rotary mower.

A rotary mower generally comprises a horizontally rotatable cutting blade supported beneath a housing. The housing is normally supported by ground engaging wheels and a suitable handle-bar assembly is provided to allow the mower to be pushed over the ground.

A motor, generally a two or four stroke petrol motor is mounted on the housing and has a main shaft that drives the cutting blade. In some cases the motor also drives the ground engaging wheels.

Rotary mowers have proved very effective mowers especially in rougher environments.

Recently there has been a growing trend to the use of mechanical edging or trimming devices. These devices comprise a rotating cutting means that can be directed to operate in a variety of planes thus proving a most effective means of trimming edges and cutting grass at places where a mower cannot obtain access, such as against walls or near tree trunks.

To overcome the need for separate mechanical edging devices it has been proposed to provide bolt on attachments for mowers that in effect provide the desired edging facility.

U.S. Pat. Nos. 3,407,579, 3,871,161, 3,686,839, 2,771,730, 3,710,563 and 3,304,700 all relate to attempts to provide a demountable edging attachment for motor mowers.

The devices disclosed in the U.S. patents referred to above vary in manufacturing cost, simplicity in use and effectiveness.

The present invention reflects an appreciation of the defects and shortfalls of previous attempts to provide an effective, simple to use, reliable and safe edging attachment for motor mowers.

SUMMARY OF THE INVENTION

According to the present invention there is provided an edging assembly for attachment to a rotary mower of the kind comprising a housing supporting a motor having a main shaft that drives a cutting blade below the housing to rotate about a substantially vertical axis, the assembly comprising a support plate arranged to be secured to the housing of the mower above the rotatable cutting blade, the support plate having mounted thereon an axially rotatable drive shaft, the drive shaft co-axially supporting an idler pulley and a drive pulley, belt means for connecting said pulleys to the main shaft of the mower, means to selectively transfer the belt from one pulley to another, rotatable edging means supported by said plate, and a flexible spindle drive transferring drive from the drive shaft to the edging means.

Preferably the drive shaft and pulleys are mounted on the support plate to be displaceable relative to the motor of the mower to vary the tension in the drive belt.

Preferably the drive shaft is supported to be freely rotatable within a collar that is pivotally supported by the support plate and the constraining means is preferably supported by the collar, means being provided to displace the constraining means to effect displacement of the drive belt from one pulley to another.

In a preferred embodiment the edging means is mounted to be rotatable about a boom assembly secured to the support plate, the boom assembly allowing adjustability of the cutting plane of the edging means.

Preferably the edging means comprises a thin strip of plastics or metal wound on a spool with one end extending radially therefrom, the spool being detachably secured to a rotatable shaft driven by the spindle drive so that in use, the spool is rotated so that the free end of the strip effects a cutting action.

BRIEF DESCRIPTION OF THE DRAWINGS

One embodiment of the invention will now be described by way of example only with reference to the following drawings in which:

FIG. 2 is a front elevation of the assembly with details of the mower omitted;

FIG. 3 is a view taken along the lines 3—3 of FIG. 2; and

FIG. 4 is a cross-sectional view taken along the lines 4—4 of FIG. 2.

DESCRIPTION OF THE PREFERRED EMBODIMENT

Figure 1:
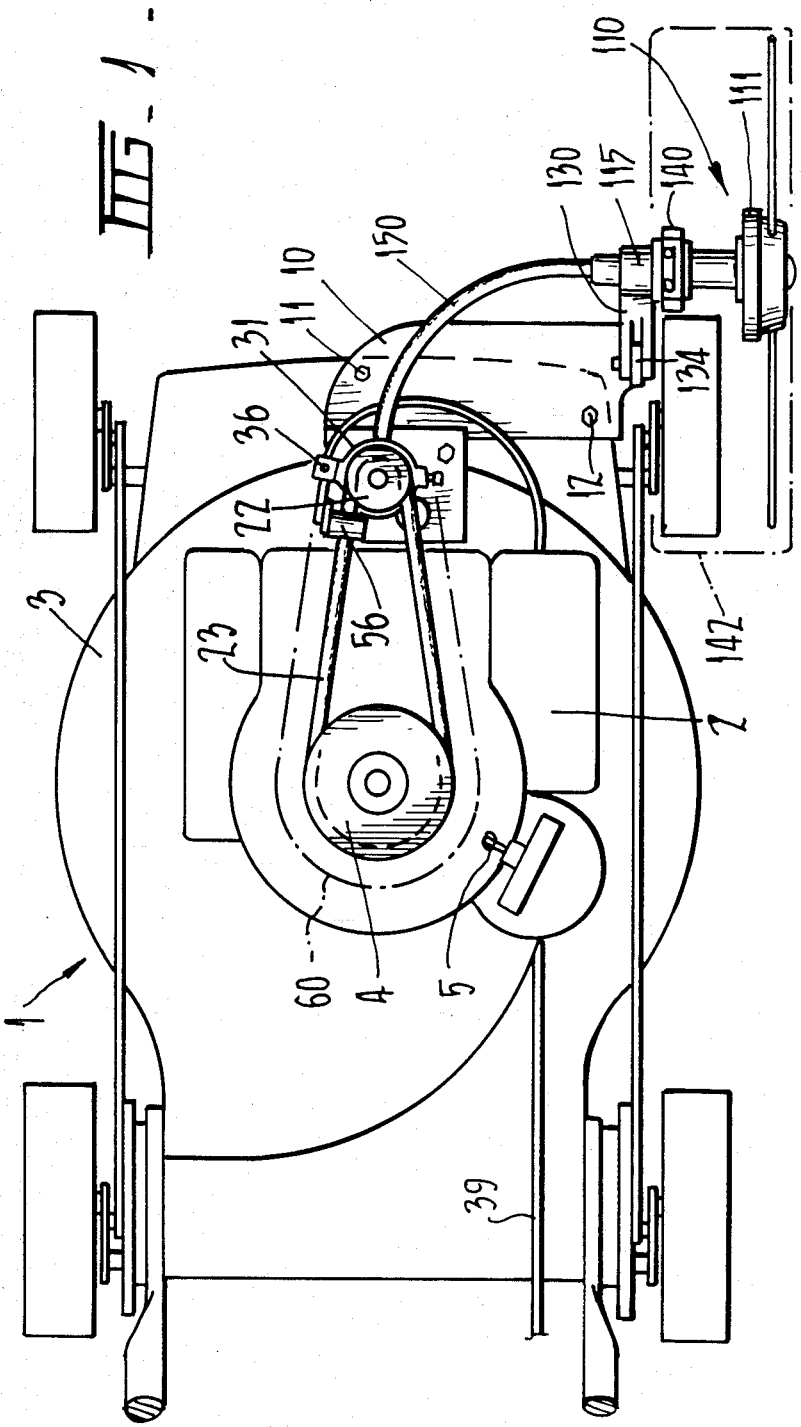
FIG. 1 is a plan view of a motor mower with an edging assembly attached thereto.

The accompanying drawings illustrate an edging attachment for a rotary mower 1. The type of rotary mower that this edging attachment relates to is a machine of the kind that has an electric or fuel driven motor 2 positioned on the upper side of a housing 3. Although not shown, the flywheel of the motor drives a circular disc via a main shaft. The disc has a plurality of cutting blades attached to its periphery. Axis of rotation of the cutting disc is normally vertical and the motor 3 normally incorporates a pulley 4 co-axial with the rotatable axis of the cutting blades. A rope 5 or other suitable means is wrapped round the pulley 4 and can be pulled to cause rotation of the pulley 4 to effect starting of the motor 2. Mowers of the kind described above have proved effective grass cutters but do not incorporate means for trimming the edges of lawns, beds and borders. The edging attachment described hereunder is specifically designed to be simply bolted onto an existing rotary mower to provide an edging facility.

The edging attachment comprises a substantially flat steel support plate 10 that is firmly secured to the upper surface of the housing 3 of the rotary mower, by bolts 11 and 12. It is understood that the precise shape of the plate and the positioning and configuration of the bolts may vary to suit the housings of particular brands of mower.

The support plate 10 has welded thereto a piece of hollow pipe 13. The axis of the pipe is arranged to be substantially perpendicular to the planar surface of the plate. A mounting sleeve 15 is welded to one edge of a piece of pipe 16 that is a sliding fit within the bore of the pipe 13. Suitable locking means in the form of a bolt 17 that extends through the wall of the pipe 13 is provided to selectively lock the pipe 16 in a particular position relative to the pipe 13. The mounting sleeve 15 has an internal bore 18 which supports a plurality of roller bearings 19 that are co-axially mounted on a stepped drive shaft 20 that in turn co-axially supports an idler pulley 21 and a drive pulley 22. The idler pulley 21 is directly below the drive pulley 22 and the drive pulley imparts rotation to the drive shaft 20. The arrangement is such that the axes of the pulleys is parallel to the axis of the pulley 4 on the top of the motor 2 of the mower 1 so that by use of a suitable belt 23 rotation of the shaft of the motor can be transmitted to the shaft 20. The exterior 30 of the mounting sleeve 15 supports a collar 31 that has attached thereto a vertically extending guide 33 into which an L-shaped bracket 34 is slidably located. The guide 33 and L-shaped bracket 34 are each provided with projecting flanges 36 and 37 that are positioned one above the other in a parallel configuration and held in a spaced apart manner by a coil spring 29. A suitable Bowden cable 39 is attached to the flange 37 to extend co-axially through the spring 29 and through the flange 36 in the L-shaped bracket 34. The cable is attached to the handle (not shown) of the mower and can be activated by the user of the mower to displace the L-shaped bracket 34 up and down against the spring 29. The opposite end 40 of the L-shaped bracket supports a fulcrum member that is in the form of a metal plate 51 having a projecting spindle 52 that is in pivotal relationship with the upper end 40 of the L-shaped plate. The plate 51 also has projecting therefrom a pair of roller spindles 54 and 55 that support freely rotatable rollers 56 and 57. The rollers are arranged so that their axes are parallel and the peripheries are adjacent one another. In use, the drive belt 23 extends between the rollers in close proximity to their peripheries so that displacement of the cable and thus the L-shaped member has the effect of causing the fulcrum to pivot about the spindle 52 thereby raising or lowering the rollers 56, 57. This has the effect of causing the drive belt to be displaced up and down from the idler pulley 21 to the drive pulley 22 or vice versa.

The pivotal relationship between the mounting sleeve 15 and the outstanding pipe 13 allows the drive belt 23 to be tensioned by pivoting the mounting sleeve and pulleys 21 and 22 away from the pulley 4 on the motor 2 of the mower. The vertical relationship of the sleeve 15 with the pipe 13 can also be adjusted to answer that the pulleys 21 and 22 are at about the same height as the pulley 4 on the motor. The locking bolts 17 can be used to clamp the assembly with the belt tensioned for effective drive.

A suitable cover 60 extends between the pulley 4 of the motor and the drive pulley 22 to cover the pulleys and the interconnecting drive belt 23.

The edging means comprises a proprietary edge cutter assembly 110 in the form of a strip of nylon 119 that is wound onto a spool 111 that is in turn spring loadably mounted within a rotatable drum 112. The drum 112 includes a sleeve 113 that is driven by a drive shaft 114 on bearings that are freely rotatable within a collar 115 on bearings 116 and 117. The sleeve 113 of the cutting means may be released by means of a set screw 116. The nylon cord can be pulled out of the drum through a slot 120 to a suitable cutting length 1'. The whole assembly spins and the nylon cord acts as the cutting medium. When the cord wears out or breaks off a further length can be pulled from the spool until the spool of cord has been used up in which case the spool can be replaced. This is a proprietary edging means and it is understood that this invention is suitable for application to this and other commercially available edging means. It is further understood that the edging assembly may comprise one or more cutting blades rotatable about a shaft.

The edging assembly 110 is supported by the plate 10 via a boom assembly that allows angular adjustability in at least two planes. The collar 115 has a radially extending lug 117 welded thereto, the lug 117 is pivotally supported by one end 131 of a bracket 130 having mutually perpendicular forked ends 131 and 137 interconnected by a flange 133. The forked end 132 is pivotally supported by an upstanding lug 134 welded to the plate 10. Nut and bolt assemblies 138 and 139 secured the forked bracket 130 to the collar 115 and plate 10 respectively. The pivotal relationship between the sleeve 115, forked bracket and support plate is adjustable so that the angular relationship of the edger can be adjusted in more than one place relative to the support plate and thus the housing of the mower. The external surface of the rear of the sleeve 115 supports an adjustable collar 140 that in turn has a radially extending flange 141 that supports an arcuate guard 142 that extends over the edging means 110. A suitable adjustable lock screw 144 extends through the collar 140 so that the arcuate position of the guard 142 relative to the edging means 110 may be varied to suit the angular orientation of the edging means. The pivotal adjustability is such that the edging means can be adjustably positioned in all planes to facilitate various types of use with the housing at all times protecting the user of the mower from contact with the edging cord.

The drive between the drive shaft 114 of the edging means 110 and the base of the pulley driven shaft 20 is effected by means of a flexible spindle drive 150 that is supported within an outer cable having threaded end pieces that are screwed into the base of the support sleeves. The outer cable has its interior coated with a grease to reduce friction and wear of the spindle drive. The spindle drive allows the rotation of the vertically extending drive shaft 20 to be transmitted to the horizontally extending drive shaft 114 that drives the edging means 110.

The edging assembly described above is designed to be attached to conventional motors by simple means. The belt drive and disengagable pulleys allow simple disconnection of the edging assembly when not required. The flexible spindle drive provides a simple yet effective means of transmitting the drive to the edging means which operates on an axis substantially 90 degrees to the axis of the pulley on the motor. The mounting of the drive shaft and pulley as well as the boom assembly of the edging means provides adjustability for both various types of mower and user requirements. The cutting angle of the edging means can be varied in two planes to suit particular environments.

The assembly is designed to fit a variety of mowers with little or no modification. The assembly is also designed to be efficient and cost effective whilst at the same time requiring minimal skill to attach, use and maintain.

Having now described my invention, what I claim is:

1. An edging asssembly for attachment to a rotary mower of the kind comprising a housing supporting a motor having a main shaft that drives a cutting blade below the housing to rotate about a substantially vertical axis, the assembly comprising a support plate arranged to be secured to the housing of the mower above the rotatable cutting blade, the support plate having mounted thereon an axially rotatable drive shaft, the drive shaft co-axially supporting an idler pulley and a drive pulley, a drive belt for connecting said pulleys to the main shaft of the mower, the drive shaft and pulleys being mounted on the support plate to be displaceable relative to the motor of the mower to vary the tention in the drive belt, the drive shaft being supported to be freely rotatable within a collar that is pivotably supported by the support plate, the drive belt extending past a pair of rollers positioned one on each side of the drive belt and supported on a slide which is displaceable relative to the collar to transfer the belt from one pulley to another, a cable control coupled to the slide to effect displacement of the slide, rotatable edging means supported by said plate, and a flexible spindle drive transferring drive from the drive shaft to the edging means.

2. The edging assembly according to claim 1 wherein the edging means is supported to rotate on an axis that is generally perpendicular to the axis of rotation of the cutting blade, the axes of the drive shaft and pulleys being substantially parallel to the axis of rotation of the main shaft of the motor.

3. The edging assembly according to claim 1 wherein the flexible spindle drive connecting the drive shaft to the rotatable edging means is housed to be freely rotatable in a lubricated casing.

4. The edging assembly according to claim 1 wherein the edging means is mounted to be rotatable about a boom assembly secured to the support plate, the boom assembly allowing adjustability of the cutting plane of the edging means.

5. The edging assembly according to claim 1, wherein the edging means comprises a thin strip of plastics or metal wound on a spool with one end extending radially therefrom, the spool being detachably secured to a rotatable shaft driven by the spindle drive so that in use, the spool is rotated so that the free end of the strip effects a cutting action.

6. The edging assembly according to claim 1, wherein the boom assembly supports a guard that extends over the upper path of the edging means, the position of the guard relative to the path of the edging means being adjustable.

7. The edge assembly according to claim 5 wherein the boom assembly supports a guard that extends over the upper path of the edging means, a position of the guard relative to the path of the edging means being adjustable.

8. An edging assembly for attachment to a rotary mower of the kind comprising a housing supporting a mower having a main shaft that drives a cutting blade below the housing to rotate about a substantially vertical axis, the assembly comprising a support plate arranged to be secured to the housing of the mower above the rotatable cutting blade, the support plate having mounted thereon an axially rotatable drive shaft, the drive shaft co-axially supporting an idler pulley and a drive pulley, a drive belt for connecting said pulleys to the main shaft of the mower, means to selectively transfer the belt from one pulley to another, a boom assembly secured to the support plate, edging means mounted to be rotatable about said boom assembly, and a flexible spindle drive transferring drive from the drive shaft to the edging means, the boom assembly allowing adjustability of the cutting plane of the edging assembly.

9. The edging assembly according to claim 8 wherein the edging means is supported to rotate on an axis that is generally perpendicular to the axis of rotation of the cutting blade, the axes of the drive shaft and pulleys being substantially parallel to the axis of rotation of the main shaft of the motor.

10. The edging assembly according to claim 8 wherein the flexible spindle drive connecting the drive shaft to the rotatable edging means is housed to be freely rotatable in a lubricated casing.

11. The edging assembly according to claim 8, wherein the edging means comprises a thin strip of plastics or metal wound on a spool with one end extending radially therefrom, the spool being detachably secured to a rotatable shaft driven by the spindle drive so that in use, the spool is rotated so that the free end of the strip effects a cutting action.

12. The edging assembly according to claim 8, wherein the boom assembly supports a guard that extends over the upper path of the edging means, the position of the guard relative to the path of the edging means being adjustable.

13. The edging assembly according to claim 8, wherein the drive shaft and pulleys are mounted on the support plate to be displaceable relative to the motor of the mower to vary the tension in the drive belt.

14. The edging assembly according to claim 8, wherein the drive shaft is supported to be freely rotatable within a collar that is pivotally supported by the support plate.

15. The edging assembly according to claim 14, wherein the drive belt extends through constraining means supported by the collar, means being provided to displace the constraining means to effect displacement of the drive belt from one pulley to another.

16. The edging assembly according to claim 15, wherein the constraining means comprises a pair of rollers positioned one on each side of the drive belt and supported on a slide which is displaceable relative to the collar, a cable control being provided to effect the displacement.

17. An edging assembly for attachment to a rotary mower of the kind comprising a housing supporting a motor having a main shaft that drives a cutting blade below the housing to rotate about a substantially vertical axis, the assembly comprising a support plate arranged to be secured to the housing of the mower above the rotatable cutting blade, the support plate having mounted thereon an axially rotatable drive shaft, the drive shaft co-axially supporting an idler pulley and a drive pulley, a drive belt for connecting said pulleys to the main shaft of the mower, the drive belt extending past a pair of rollers positioned one on each side of the drive belt and supported on a slide which is displaceable relative to the collar to transfer the belt from one pulley to another, a cable control coupled to the slide to effect displacement of the slide, rotatable edging means supported by said plate, and a flexible spindle drive transferring drive from the drive shaft to the edging means.

* * * * *